Patented May 23, 1950

2,509,051

UNITED STATES PATENT OFFICE 2,509,051

EXTRACTION OF ALKALOIDS FROM FRESH PLANTS

Norman Applezweig, New York, N. Y.

No Drawing. Application April 17, 1946,
Serial No. 662,917

9 Claims. (Cl. 260—292)

This invention relates to a process for the extraction of alkaloids from fresh plants, and more particularly to an extraction process in which alkaloid-containing parts of fresh plants are crushed, the juice separated from the pulp, and alkaloids extracted from the juice by contact with an ion-exchange material.

As a result of the recent war the supply of many natural alkaloids has been cut off or sharply reduced. To meet this situation it has been proposed to grow alkaloid-yielding plants in consuming countries under favorable plantation conditions and recover alkaloids from the plants. Such efforts have met with some degree of success, for example, in the United States.

There are, however, disadvantages in present procedures that limit the usefulness of this plan. The harvesting season for most such crops is short and labor costs in the major consuming countries are relatively high; these conditions impose a burden of cost and operational difficulties. Furthermore, present methods of recovery in general require drying of the plants; this necessitates a considerable investment for equipment that is idle most of the year, and involves product losses on drying.

It is one object of my invention to provide a process of extracting alkaloids from plants which obviates or minimizes the necessity of drying the plants before extraction.

It is another object of my invention to provide a process of this kind which may be efficiently carried out with simple equipment.

It is a further object of my invention to provide a process of this kind adapted to operation in the field, thus avoiding the necessity of transporting a mass of inert material.

Other objects and advantages of my invention will be apparent from the following description.

The alkaloids in general are complex organic nitrogen bases which are soluble in organic solvents and form water-soluble salts with strong inorganic acids such as sulfuric and hydrochloric acids. The bases themselves may be water-soluble or -insoluble. The alkaloids occur in various plant organs—bark, leaves, roots, fruit bulbs, etc.—usually as salts of organic plant acids or otherwise combined with organic plant materials, but in some cases at least in part as free bases.

According to my invention I harvest the plants or desired plant parts, comminute and crush the harvested material, separate the juice from the pulp, and treat the separated juice with a cation-exchange material to remove alkaloid ions from the juice. At suitable intervals I then recover the alkaloid from the ion-exchange material, for example by treating the latter with an alkaline material and an organic solvent for the alkaloid. This may be done in two steps, viz. by treating the exchange material with an aqueous alkaline solution, and then extracting the liberated alkaloid with an organic alkaloid solvent. I prefer, however, to recover the alkaloid in one step as by extraction of the exchange material with ammoniacal ethanol. Among the solvents that may be used after aqueous alkaline treatment are lower aliphatic alcohols and ketones, lower aliphatic chlorinated hydrocarbons, etc.

For the one step treatment, methanol, ethanol, propanol or the like, containing a dissolved volatile alkali, may be used.

I may run the exhausted juice to waste and discard the pressed pulp. Or, if economic conditions justify more complex treatment, I may extract the pressed pulp with exhausted juice (which may be diluted before use) or with water or with dilute aqueous acid, and treat such extract with ion-exchange material to recover additional amounts of alkaloid. I may, if it appears desirable, repeat this extraction cycle one or more times. Alternatively, I may dry the pressed pulp and recover its alkaloid content by conventional means; in this case the saving over conventional methods is less, but the drying step is greatly facilitated by the prior removal of juice.

I have found that with ordinarily available comminuting and crushing apparatus I may recover as much as 50% of the alkaloid content of some plants by the first-described embodiment of my method. By using more efficient comminuting apparatus and high pressures in the crushing step I may greatly increase the percentage recovery. Also I may increase recovery by employing the additional pulp-extraction steps described. The extent to which higher yields will justify greater equipment investment and process complexity will be determined largely by economic considerations in each particular case.

My process is susceptible of being partly or completely mechanised, and is particularly adapted to recovering alkaloids from fleshy annuals which are advantageously harvested whole by a mechanical harvester, e. g. Datura innoxia from which scopolamine is obtained.

Among the plants which may be treated by my process are Atropa belladonna (leaves and stems) yielding atropine; Datura stramonium, yielding atropine; cinchona, especially the fleshy leaves and stems of young plants, yielding quinine alkaloids.

Several types of cation-exchange material may be used in my invention, but the synthetic types are preferred to the natural clays; such synthetic materials are represented by sulfated coal—e. g. the "Zeokarbs" manufactured by the Permutit Company—and by synthetic resins containing functional acid groups such as "Amberlite IR-100" manufactured by The Resinous Products & Chemical Co., and "Ionac C" manufactured by American Cyanamid & Chemical Corporation.

These materials must be in active form. Ordinarily I prefer to convert them to the hydrogen cycle by pretreatment with acid before use; they then adsorb alkaloid cations and in exchange for them release hydrogen ions into the solution. Alternatively the exchange materials may be converted to other cycles, e. g. the sodium or ammonium cycles, in which case the latter ions are exchanged for alkaloid ions. The hydrogen cycle has proved most satisfactory in use; one advantage is that the resulting effluent is acid, and accordingly is an excellent extractant for additional alkaloid if recirculated as described above.

An example of the practice of my invention follows:

*Example*

One ton of leaves and stems of freshly harvested *Datura innoxia* plants, containing approximately 0.05% scopolamine, and corresponding to approximately 400 lb. air-dried material, are cut to approximately 1-inch pieces in a feed chopper, and chopped pieces passed through a juice expresser of the screw type. The expressed juice, amounting to about 640 pounds, is collected; the pressed pulp may be spread on a screen to dry for further conventional processing, may be used as a mulch on the field or may be discarded. Alternatively, it may be subjected to extraction with exhausted juice to produce a further yield of alkaloid.

The separately collected juice is then passed up-flow at a steady rate of approximately 2.5–3 l. per minute through a column 12 inches in diameter and 30 inches high of Amberlite IR-100, previously brought to the hydrogen cycle by treatment with acid. The Amberlite is contained in a column having a bottom inlet, bottom drain and top overflow. I have found that fine suspended solid matter in the juice passes more freely through the Amberlite bed with up-flow than with down-flow and accordingly clogging of the column is avoided by up-flow of the juice. Circulation of the juice may be effected by gravity feed from an elevated tank or by a small pump such as a gear pump.

The juice which has passed through the column has been stripped of its alkaloids (as shown by a negative test for alkaloids by Mayer's reagent) by exchange of the alkaloids for hydrogen ions, and appears at the overflow as a weakly acidified liquor. It may be used to reextract the pulp by maceration or percolation, or it may be discarded as, for example, by running on to the field, where it contributes to the soil the plant-food constituents it retains after removal of alkaloid.

The Amberlite in the column is then washed free of juice by up-flow displacement with water, the water is drained off and the column is filled with ammoniacal ethanol containing 5–10% by weight of $NH_3$. After allowing the Amberlite to remain in contact with the ammoniacal alcohol for ½–2 hours, the latter is displaced by up-flow of several volumes of fresh alcohol, the column drained and the entire effluent distilled to remove ammonia and alcohol. The still residue is a concentrated syrup containing 200–250 grams scopolamine as a high-grade crude product.

An additional 10–30% of the scopolamine present in the plants may be recovered by macerating the pressed pulp with the stripped juice obtained from a previous column operation or with water made weakly acid with HCl, separating pulp and extract, and recovering scopolamine from the extract by contact with Amberlite as described above.

Scopolamine is isolated from the concentrated syrupy distillation residue by dissolving the residue in an equivalent of concentrated hydrobromic acid, evaporating at low temperature to small volume, and crystallizing scopolamine as the hydrobromide from the resulting concentrated aqueous solution.

I claim:

1. The process of recovering an alkaloid of the class consisting of scopolamine and atropine from fresh plants containing said alkaloid, which comprises: separating alkaloid-containing juice from plant parts, bringing separated juice into contact with a solid cation-exchange material whereby alkaloid is transferred from the juice to the cation-exchange material, separating the stripped juice from the cation-exchange material, and recovering alkaloid from the cation-exchange material.

2. The process of recovering an alkaloid of the class consisting of scopolamine and atropine from fresh plants containing said alkaloid, which comprises: harvesting alkaloid-containing parts of the plants, comminuting the harvested plant parts, subjecting the comminuted portions to pressure to express alkaloid-containing juice therefrom, contacting the expressed juice with a cation-exchange material in the hydrogen cycle to effect transfer of alkaloid from the juice to the exchange material, separating the exchange material and associated alkaloid from the stripped juice, and recovering alkaloid from the thus treated exchange material.

3. The process of recovering an alkaloid of the class consisting of scopolamine and atropine from fresh plants containing said alkaloid, which comprises: harvesting alkaloid-containing parts of the plants, comminuting the harvested plant parts, subjecting the comminuted plant parts to pressure to express alkaloid-containing juice therefrom, contacting the expressed juice with a cation-exchange material to effect transfer of alkaloid from the juice to the exchange material, separating the exchange material and associated alkaloid from treated juice, and recovering alkaloid from the exchange material by extracting the latter with an alcoholic solvent for the alkaloid, the solvent extractant containing a dissolved volatile base.

4. The process defined in claim 1, in which the cation-exchange material is a high-molecular-weight synthetic carbon-containing product insoluble in water and containing functional acid groups in its molecules.

5. In combination with the process defined in claim 2, the further steps comprising: bringing the juice separated from the cation-exchange material into intimate contact with plant parts from which juice has been previously expressed, whereby the alkaloid-depleted juice extracts additional alkaloid from the plant parts, separating the alkaloid-enriched juice from the plant parts, and recovering alkaloid from the enriched juice by further contact with cation-exchange material.

6. The process defined in claim 2, in which the alkaloid-containing plants are *Datura innoxia* and the alkaloid recovered is scopolamine.

7. The process defined in claim 3, in which the volatile base is ammonia.

8. In combination with the process defined in claim 3, the further step of distilling the alkaline alcoholic alkaloid extract to remove alcohol and volatile base as overhead, whereby a distillation residue is obtained highly enriched in alkaloid.

9. In the recovery of an alkaloid of the class consisting of scopolamine and atropine from plants containing said alkaloid, the step of contacting alkaloid-containing juice expressed from such plants with a solid cation-exchange material.

NORMAN APPLEZWEIG.

REFERENCES CITED

The following references are of record in the file of this patent:

UNITED STATES PATENTS

| Number | Name | Date |
|---|---|---|
| 1,048,712 | Lloyd | Dec. 31, 1912 |
| 1,300,747 | Lloyd | Apr. 15, 1919 |
| 2,293,954 | Tiger et al. | Aug. 25, 1942 |

FOREIGN PATENTS

| Number | Country | Date |
|---|---|---|
| 805,092 | France | Aug. 17, 1936 |

OTHER REFERENCES

Bruttini: "Uses of Waste Materials," (P. S. King & Son; London, 1923), pp. 232, 234, 235, 242, and 251.

J. Am. Chem. Soc., 66, 1990 (1944).

Waldbott: J. Am. Chem. Soc., 27, 8 (1905) [Cited as Ref. 12 in Ind. & Eng. Chem. 38, 576–579 (1946)].